US012391448B2

(12) United States Patent
Kong et al.

(10) Patent No.: US 12,391,448 B2
(45) Date of Patent: Aug. 19, 2025

(54) DOUBLE FORMULATION PACKAGING POUCH WITH EASY-OPENING AND EASY-LIQUID DRINKING FEATURES

(71) Applicants: JBBIO CO., LTD., Seoul (KR); Byoung Man Kong, Guri-si (KR)

(72) Inventors: Byoung Man Kong, Guri-si (KR); Hyeok Min Kwon, Cheongju-si (KR); In Gyu Park, Seoul (KR); Mi Kyoung Kim, Seoul (KR)

(73) Assignees: JBBIO CO., LTD., Seoul (KR); Byong Man Kong, Guri-si (KR)

( * ) Notice: Subject to any disclaimer, the term of this patent is extended or adjusted under 35 U.S.C. 154(b) by 22 days.

(21) Appl. No.: 18/635,428

(22) Filed: Apr. 15, 2024

(65) Prior Publication Data

US 2024/0351768 A1 Oct. 24, 2024

(30) Foreign Application Priority Data

Apr. 19, 2023 (KR) ........................ 10-2023-0051572

(51) Int. Cl.

*B65D 75/58* (2006.01)
*A61J 1/03* (2023.01)
*B65D 75/44* (2006.01)

(52) U.S. Cl.

CPC ............ *B65D 75/5827* (2013.01); *A61J 1/03* (2013.01); *B65D 75/44* (2013.01); *B65D 2585/56* (2013.01)

(58) Field of Classification Search

CPC ................ B65D 75/5827; B65D 75/44; B65D 2585/56; B65D 75/5805; B65D 75/5816; B65D 81/3261; B65D 77/38; B65D 77/08; B65D 77/22; B65D 35/22; B65D 81/3272; B65D 31/12; B65D 75/5822; B65D 75/527; B65D 81/3266; A61J 1/03; A61J 1/2093

(Continued)

(56) References Cited

U.S. PATENT DOCUMENTS 9,108,381 B2 * 8/2015 Steele ..................... B31B 70/62
11,548,712 B2 * 1/2023 Nash .................... B65D 75/008

(Continued)

FOREIGN PATENT DOCUMENTS

KR 20-1994-0000432 U 1/1994
KR 10-2021-0039613 A 4/2021

*Primary Examiner* — Christopher R Demeree
(74) *Attorney, Agent, or Firm* — MEDLER FERRO WOODHOUSE & MILLS PLLC

(57) ABSTRACT

The present invention provides a double formulation packaging pouch with easy-opening and easy-liquid drinking features, which includes: a pouch body having a hollow storage space formed by sealing both ends of a rectangular packaging film; an upper sealed part formed by sealing an upper opening of the pouch body; a lower sealed part formed by sealing a lower opening of the pouch body; a sealed partition part formed by connecting a first partition line extending downward and a second partition line extending laterally with each other, then sealing front and rear sides of the packaging pouch along the first and second partition lines, to form a pill storage compartment and a potion storage compartment; a cutting line part formed at an upper portion of the pouch body by penetrating at least one layer; and a cutting notch formed by cutting away a predetermined section of the upper sealed part.

5 Claims, 9 Drawing Sheets

(58) Field of Classification Search
USPC ........................................ 229/87.05; 383/200
See application file for complete search history.

(56) References Cited

U.S. PATENT DOCUMENTS

| | | | | |
|---|---|---|---|---|
| 2015/0251831 | A1* | 9/2015 | Steele ................ | B65D 75/5816 383/200 |
| 2021/0022967 | A1* | 1/2021 | Tao ...................... | A61K 8/9794 |
| 2021/0284424 | A1* | 9/2021 | Balestri .............. | B65D 75/5883 |

* cited by examiner

DOUBLE FORMULATION PACKAGING POUCH WITH EASY-OPENING AND EASY-LIQUID DRINKING FEATURES

CROSS REFERENCE TO RELATED APPLICATIONS

This application claims the benefit of Korean Patent Application No. 10-2023-0051572 filed on Apr. 19, 2023, the entirety of which is incorporated by reference herein.

BACKGROUND OF THE INVENTION

1. Field of the Invention

The present invention relates to a double formulation packaging pouch with easy-opening and easy-liquid drinking features, and more specifically, to a packaging pouch in which storage spaces are formed in a packaging pouch for accommodating and storing medicines or health functional foods by partitioning an inside thereof into two compartments through sealing adhesion so that two or more types of products can be packaged separately, as well as opening means for facilitating opening of partitioned packaging spaces are provided, thereby easily and stably packaging and storing two types of products and allowing a user to easily open and take the products.

2. Description of the Related Art

In general, when oral medicines are dispensed according to a doctor's or pharmacist's prescription at a hospital or pharmacy, since the formulations of pills or capsules are completely different from powder or liquid medicine ("potion"), it is necessary for patients to accurately divide and take the respective prescribed medicines. To this end, the patients are provided with packaging pouches in which the pills or capsules and the powder or potion, etc. are divided individually and packaged separately.

In this case, it is very easy for the patients to count the number of pills or capsules, such that it is possible to accurately divide and take single dose, whereas it is very difficult to evenly divide the powder or potion by single dose. Therefore, there is a problem in that it is not possible to accurately divide and take the daily or one-time dose among the prescribed several days' worth of medicine.

In addition, when the pills or capsules and the powder or potion, etc. are packaged separately by single dose in a single packaging pouch, there is a risk that the drugs may be mixed together. Thereby, there is a problem that the ingredients of each drug may be deteriorated and medical efficacy thereof cannot be properly exerted.

Therefore, conventionally, a medicine vial attached with a pill package, which includes: a vial package for packaging a vial containing potion; synthetic resin plates on both sides that protrude in an erected state at upper both sides of the vial package; and transparent packaging papers formed on each of the synthetic resin plates on both sides to package pills, has been proposed (see Korean Utility Model Publication No. 20-1994-0000432).

The above-described prior art (Korean Utility Model Publication No. 20-1994-0000432) can be expected to have an advantage of being able to package pills and potion separately.

However, in the case of pills, each pill corresponding to single dose can be divided individually and packaged separately, while in the case of potion, several doses of the potion should be packed at once in one vial. In addition, because it is not easy for a drug user (patient) to accurately measure single dose among the several doses of potion contained in one vial and take it by dividing into certain doses, there is a problem that it is very difficult to take the correct single amount of potion prescribed by the doctor or pharmacist.

In addition, recently, a pouch which allows to separately package by individually dividing the pills or capsules and the powder or potion, etc. has been proposed (Korean Patent Publication No. 10-2021-0039613).

The pouch of the above-described prior art (Korean Patent Publication No. 10-2021-0039613) made of a thermal-bondable packaging film as a material is formed in a rectangular shape. In order to form one or more packaging spaces inside the packaging pouch, one or more packaging spaces are separately formed on one of left and right sides or on both of the left and right sides at an upper end portion of the packaging pouch, or one packaging space is separately formed at a central portion of the upper end portion of the packaging pouch. Accordingly, as a means for providing the packaging space, two or more separate packaging spaces are formed in one packaging pouch. In this case, the packaging pouch is configured so that the packaging space formed separately at the upper end portion of the packaging pouch has a small volume, while the packaging space formed throughout the packaging pouch has a large volume.

The above-described packaging pouch of the above-described prior art (Korean Patent Publication No. 10-2021-0039613) has advantages of: being able to separately package medicines such as pills or capsules and medicines such as powder or potion in one packaging pouch; and being able to open a small packaging space containing the pills and a large packaging space containing potion at the same time by a patient who wants to take two types of medicines separately packaged in one packaging pouch using an opening means to obtain opening formed at the upper end portion of the packaging pouch with one operation. However, when the upper end portion of one packaging pouch is opened, there is a problem in that it is not easy to take the potion and the pill at the same time through the opening of the large packaging space and the opening of the small packaging space which are opened simultaneously.

The reason is that, the pills, etc., which are packaged while inserted into a small packaging space additionally and separately formed at the upper end portion of the packaging pouch, may be sandwiched in close contact between the inner and outer surfaces of the packaging paper on both sides made of the synthetic resin that forms the small packaging space, such that they are not easily withdrawn, whereas the potion contained in the large packaging space is easily withdrawn through the formed opening, and thereby the potion and pill individually packaged in the small and large opened packaging spaces cannot be taken at the same time. Therefore, there is a problem that after taking the potion first, and the remaining pill which is not taken out of the small packaging space should be withdrawn separately and taken. In addition, there is also a problem that after taking the potion, the user should take the pill separately and swallow it again with water.

PRIOR ART DOCUMENT

Patent Document (Patent Document 1) Korean Utility Model Publication No. 20-1994-0000432
(Patent Document 2) Korean Patent Publication No. 10-2021-0039613

SUMMARY OF THE INVENTION

The present invention is proposed in consideration of various problems occurred in the prior art as described above, and it is an object to provide a packaging pouch, in which two or more types of products, such as medicines or health functional foods, are packaged separately by constructing a potion storage compartment and a pill storage compartment partitioned by sealing in one packaging pouch, and opening means for facilitating opening so as to open and take individually the packaged products according to the directions are provided, thereby separately packaging two types of products and allowing a user to easily open and take the double formulation packaged products.

To achieve the above object, the following technical solutions are adopted in the present invention.

A packaging pouch including: a pouch body having a hollow storage space formed by sealing and adhering both ends of a rectangular packaging film consisting of multi-layers; an upper sealed part formed by sealing and adhering an upper opening of the pouch body; a lower sealed part formed by sealing and adhering a lower opening of the pouch body; a sealed partition part formed by connecting a first partition line extending downward from an upper end of the pouch body and a second partition line extending laterally from one side of the pouch body with each other, so as to separately form a pill storage compartment and a potion storage compartment on both sides thereof by sealing and adhering front and rear sides of the packaging pouch along the first partition line and the second partition line; a cutting line part formed at an upper portion of the pouch body by penetrating at least one layer among the multi-layers of the packaging film along a predetermined virtual line; and a cutting notch formed by cutting away a predetermined section of the upper sealed part at an upper portion of the pill storage compartment.

Wherein, the cutting notch may be formed between an upper central portion of the pill storage compartment and the first partition line.

In addition, the first partition line may extend vertically downward from an upper end the pouch body, and the second partition line may extend horizontally from one side of the pouch body.

In addition, the first partition line may be spaced apart from a center of the packaging pouch to the other side by a predetermined distance.

Further, one or more of a thickness and a width of the second partition line may be formed to be relatively larger than those of the first partition line.

Further, the cutting line part may be formed by penetrating the upper portion of the packaging pouch along an imaginary line defined by one of a straight line and a dotted line extending from one end to the other end thereof.

Furthermore, a connection portion of the first partition line and the second partition line may be formed in a curved line.

Through the above-described configurations, the packaging pouch of the present invention provides the following characteristic advantages.

1) The packaging pouch of the present invention includes the pill storage compartment and the potion storage compartment partitioned on both sides based on the sealed partition part partitioning the storage space, thereby allowing two types of products including pills and potion, etc. to be packaged and accommodated separately in one packaging pouch. Thus, two types of ingredients may be safely packaged and stored so that they do not mix with each other.

2) In addition, by providing the cutting notch and the cutting line part that can separately open each of the separate pill storage compartment and potion storage compartment as described above, a user may take two types of products including pills and potion, etc. sequentially and take them. Through this, the user may take two types of products packaged in one packaging pouch according to the prescribed dosage.

3) Further, by narrowly forming the opening of the potion storage compartment partitioned and formed at the upper end the packaging pouch by the sealed partition part, a liquid product formed in potion may be easily discharged and taken.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
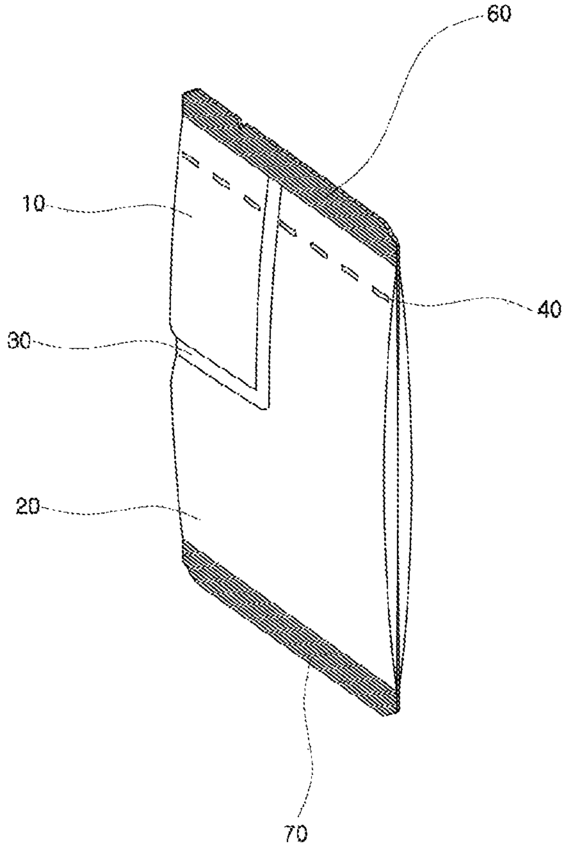
FIG. 1 is a perspective view illustrating a packaging pouch according to a preferred embodiment of the present invention.

Hereinafter, the present invention will be described in detail with reference to the accompanying drawings illustrating preferred embodiments.

In denoting reference numerals to components of respective drawings, it should be noted that the same components will be denoted by the same reference numerals although they are illustrated in different drawings. In description of preferred embodiments of the present invention, the publicly known functions and configurations related to the present invention, which are judged to be able to make the purport of the present invention unnecessarily obscure will not be described in detail.

The present invention relates to a packaging pouch with easy-opening and easy-liquid drinking features, in which storage spaces are formed in a packaging pouch for accommodating and storing medicines or health functional foods by partitioning an inside thereof into two compartments through sealing adhesion so that two or more types of products can be packaged separately, as well as opening means for facilitating opening of partitioned packaging spaces are provided, thereby easily and stably packaging and storing two types of products (herein referred to as 'double formulation') and allowing a user to easily open and take the products.

Hereinafter, in describing the configuration of the present invention, it will be described based on an embodiment in which two or more types of medicines including pills and potions are packaged, but the present invention is not limited thereto. In addition, it should be understood that the packaging pouch may be used as a packaging pouch for packaging and storing one or more products including medicines, health foods, health functional foods, health supplement food, other ingestible solid foods, or other drinkable beverages, as well as drugs.

Figure 2:
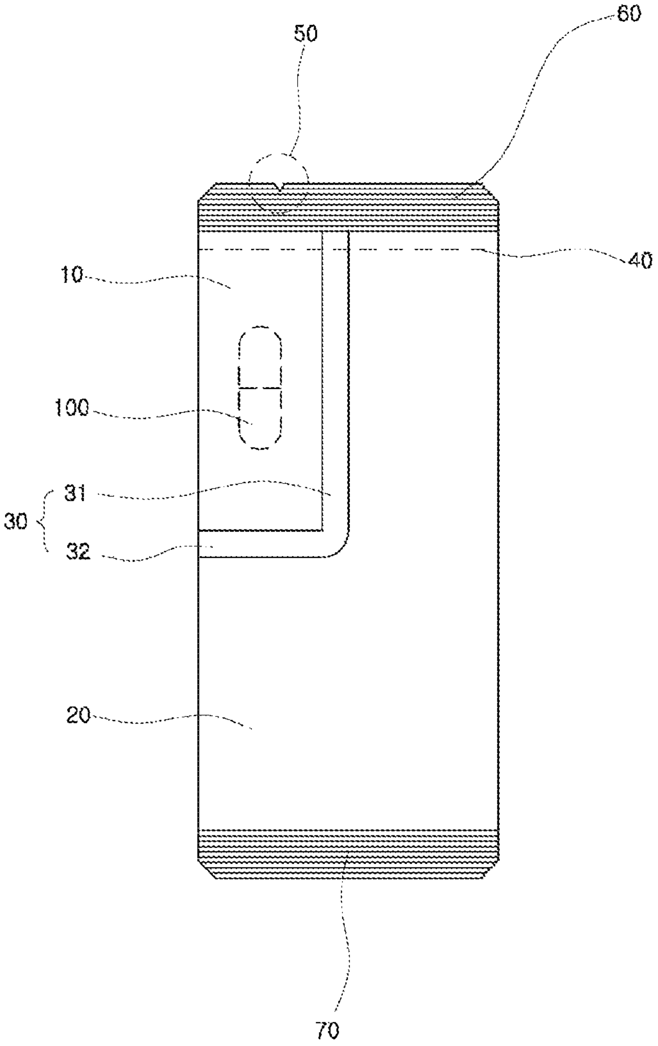
FIG. 2 is a front view illustrating the packaging pouch according to a preferred embodiment of the present invention.
Figure 3:
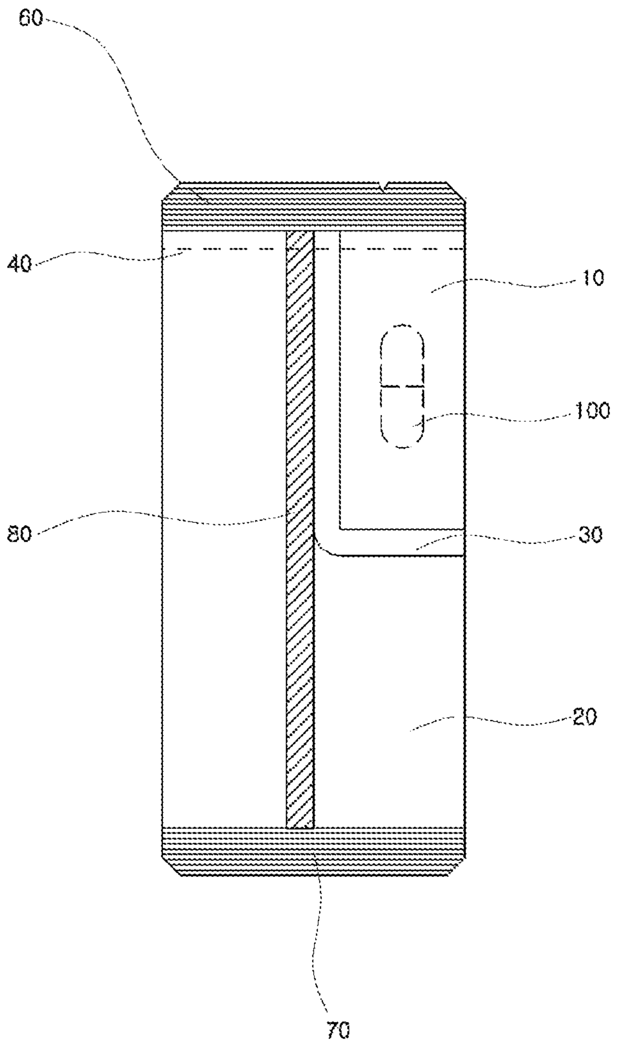
FIG. 3 is a rear view illustrating the packaging pouch according to a preferred embodiment of the present invention.

FIG. 1 is a perspective view illustrating a packaging pouch according to a preferred embodiment of the present invention, and FIG. 2 is a front view thereof, FIG. 3 is a rear view thereof.

As shown in FIGS. 1 to 3, the packaging pouch of the present invention includes: a pouch body 1 having a hollow storage space formed by sealing and adhering both ends of a rectangular packaging film consisting of multi-layers; an upper sealed part 60 formed by sealing and adhering an upper opening of the pouch body 1; a lower sealed part 70 formed by sealing and adhering a lower opening of the pouch body 1. Further, the packaging pouch includes: a sealed partition part 30 formed to partition the internal storage space of the pouch body 1; and a cutting notch 50 and a cutting line part 40 which facilitate opening of the pouch body 1.

The pouch body 1 is made of a packaging film consisting of multiple layers that can accommodate and store pills 100 and potion (not shown).

More specifically, the pouch body 1 is made of a rectangular packaging film of a synthetic resin material consisting of heat adhesive multi-layers, and both ends thereof are sealed and adhered by heat adhering, etc. to form a cylindrical hollow storage space. For example, the pouch body 1 may have a rectangular pouch shape with a narrow width obtained by forming a storage space having a cylindrical shape with a narrow inner diameter by folding one sheet of packaging film in a width direction and thermally adhering both overlapped ends, then placing the thermally adhered portion on a rear side and pressing both sides from the front and rear. The pouch body 1 may have the packaging space formed to accommodate products (pills, potion, etc.) to be packaged through the above-described processes. The open upper and lower portions of the pouch body 1 are sealed. In a preferred embodiment of the present invention, the upper and lower openings of the pouch body 1 are sealed and adhered by heat adhering to form the upper and lower sealed parts 60 and 70.

Meanwhile, the pouch body 1 of the present invention is configured to accommodate and store two or more types of drugs separately from each other. For example, there may be two or more types of medicines prescribed at the pharmacies, hospitals, etc. to treat various diseases (colds, flu, etc.). In this case, the pills or capsules and the powder or potion, etc. may be included in the medicines. Therefore, it is necessary to package two or more types of drugs separately so that they do not mix with each other. The present invention provides the storage spaces which are partitioned and formed separately from each other to accommodate and store the two or more types of medicines. In other words, the present invention consists of a double formulation packaging pouch.

The pouch body 1 of the present invention includes a pill storage compartment 10 for accommodating and storing pills or capsules (hereinafter collectively referred to as 'pills') and potion storage compartment 20 for accommodating and storing potion or powder (hereinafter collectively referred to as a 'potion'), which are partitioned and formed separately therein, so that two types of medicines can be separated and stored in pouch body 1 while preventing them from being mixed.

To this end, the pouch body 1 includes a sealed partition part 30 formed therein to partition the internal storage space thereof into the pill storage compartment 10 and the potion storage compartment 20.

The sealed partition part 30 is formed by connecting a first partition line 31 extending downward from an upper central portion of the pouch body 1, that is, a lower end of the upper sealed part 60, and a second partition line 32 extending laterally from one side of the pouch body 1 with each other, then sealing and adhering front and rear sides of the pouch body 1 along the first partition line 31 and the second partition line 32. Thus, the pill storage compartment 10 on one side and the potion storage compartment 20 on the other side based on the first partition line 31 may be separately formed in the sealed partition part 30.

In a preferred embodiment of the present invention, the first partition line 31 extends vertically downward from the upper central portion of the pouch body 1, and the second partition line 32 extends horizontally from one side of the pouch body. However, the extension directions of the first partition line 31 and the second partition line 32 are not limited thereto, and these lines may extend diagonally at a predetermined angle from the vertical or horizontal line as necessary.

In addition, in one embodiment of the present invention, the first partition line 31 may be formed to be spaced apart from a central axis of the pouch body 1 by a predetermined distance toward one side or the other side. In this embodiment, the position of the first partition line 31 is determined by avoiding the position of a rear adhered part 80 disposed on the rear side of the pouch body 1, which is intended to prevent the sealing adhesion through the first partition line 31 from interfering with the rear adhered part 80.

The sealed partition part 30 formed in the pouch body 1 extends downward from the center of the upper end portion of the pouch body 1, thereby one side of the upper opening of the pouch body 1 forms an opening of the pill storage compartment 10, and the other side forms an opening of the potion storage compartment 20. Accordingly, the opening formed in the upper portion of the potion storage compartment 20 has an inlet formed relatively narrower than the lower portion of the potion storage compartment 20. In this way, the narrow opening of the potion storage compartment 20 allows the potion formed as a liquid formulation to be easily discharged by pouring it out, or the user may easily take it by putting the narrow opening of the potion storage compartment 20 in the mouth and inhaling it.

Figure 8:
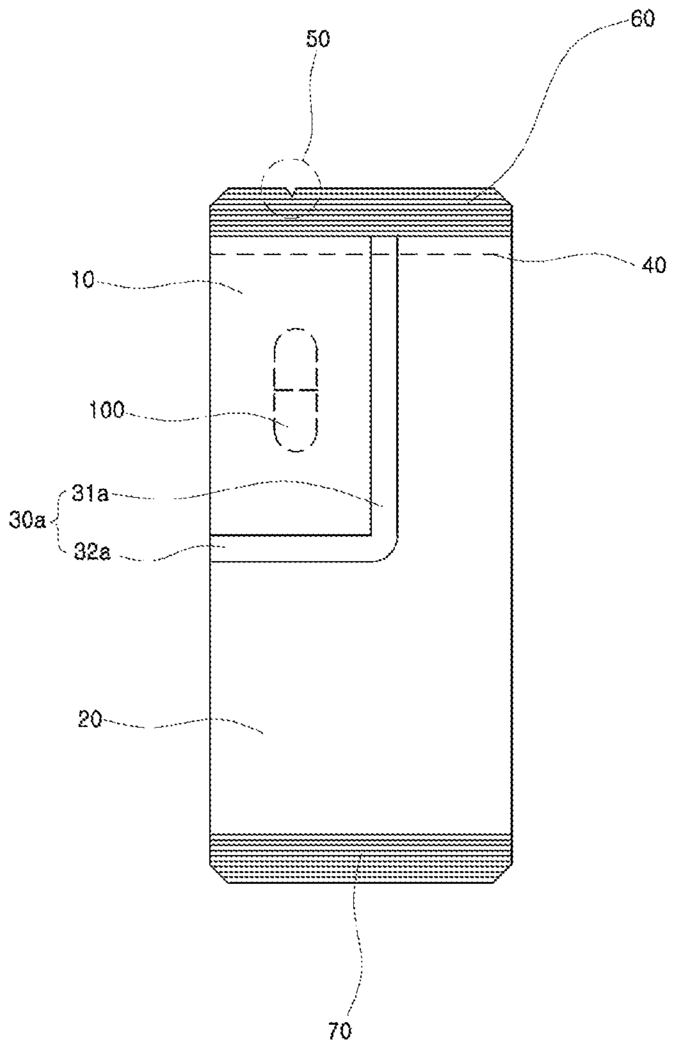
FIG. 8 is a front view illustrating a packaging pouch according to another embodiment of the present invention.

In one embodiment of the present invention, in order to maximize the above advantages, the first partition line 31 may be arranged to shift it by a predetermined distance from the central axis of the pouch body 1 to the other side, that is, toward the potion storage compartment 20. FIG. 8 shows a sealed partition part 30*a* including a first partition line 31*a* of an embodiment of the present invention arranged as described above. In this embodiment, the first partition line 31*a* is shifted from the center to the other side, and the second partition line 32*a* extends by the predetermined distance further toward the other side, thereby opening the potion storage compartment 20 formed at the upper end of the pouch body 1 may be formed more narrowly.

Meanwhile, in a preferred embodiment of the present invention, a connection portion of the first partition line 31 and the second partition line 32 is formed in a curved line.

Since the pouch body 1 of the present invention is made of the packaging film, it may be affected by pressure applied from an outside, and if it ruptures due to the external pressure, the contained products may leak out and make it impossible to take. In particular, air is contained inside of the pill storage compartment 10 together with the pills, and the liquid potion is filled and sealed inside of the potion storage compartment 20, such that an external force applied thereto may be transmitted to the pill storage compartment 10 and the potion storage compartment 20 as a whole. In this case, if the sealed partition part 30 is formed at a right angle, stress may be concentrated on the corner thereof. However, in the present embodiment, by forming the connection portion of the first partition line 31 and the second partition line 32 in the curved curve, it is possible to prevent the stress due to the external pressure from concentrating on the connection portion of the first partition line 31 and the second partition line 32.

Figure 9:
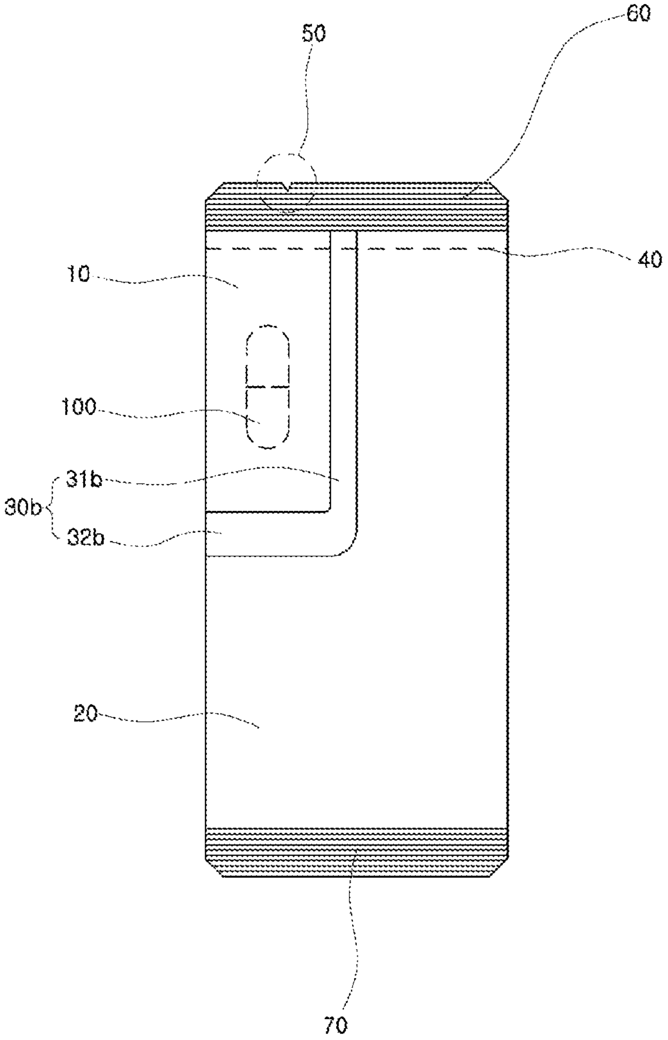
FIG. 9 is a front view illustrating a packaging pouch of another embodiment of the present invention.

Meanwhile, in one embodiment of the present invention, the thickness or width of the second partition line constituting the sealed partition part is formed to be relatively larger than that of the first partition line. FIG. 9 shows a sealed partition part 30*b* including a second partition line 32*b* of another embodiment of the present invention configured as described above.

In the case of the second partition line 32*b*, when opening the pill storage compartment 10, since a cutting direction may be developed toward the second partition line 32*b* by a cutting notch 50, which will be described below, there is a possibility that the cut surface is developed through the second partition line 32*b*. In this case, as the pouch body 1 is torn, a portion of the potion storage compartment 20 may be opened to cause a leakage of the potion. In order to prevent this phenomenon, the thickness or width of the second partition line 32*b* may be formed to be larger than the first partition line 31*b* thus to increase the rigidity, and thereby solving the problems as described above.

Meanwhile, in a preferred embodiment of the present invention, the pill storage compartment 10 in the pouch body 1 is a space for storing pills, capsules, etc., and may be configured to form a small storage space depending on the application thereof. On the other hand, the potion storage compartment 20 in the pouch body 1 is a space for storing potion or powder, and is preferably configured to form a relatively larger storage space than the pill storage compartment 10.

As shown in the drawings, the pill storage compartment 10 is formed on one side of the first partition line 31 and the upper portion of the second partition line 32 in the pouch body 1, and the potion storage compartment 20 is formed by including all the remaining portions within the pouch body 1 except for the pill storage compartment 10. Accordingly, the potion storage compartment 20 has a relatively larger accommodation space than the pill storage compartment 10, and this configuration corresponds to the case where the volume of the potion is relatively larger than the commonly prescribed pills.

In addition, as described above, the sealed partition part 30 formed in the pouch body 1 extends downward from the center of the upper end portion of the pouch body 1, thereby one side of the upper opening of the pouch body 1 forms the opening of the pill storage compartment 10, and the other side forms the opening of the potion storage compartment 20. Accordingly, the width of the opening in the upper portion of the potion storage compartment 20 is formed to be narrower than that of the lower portion of the potion storage compartment 20. Thereby, such the narrow opening of the potion storage compartment 20 allows the potion formed as a liquid formulation to be easily discharged by pouring it out, etc., or the user may easily take it by putting the narrow opening of the potion storage compartment 20 in the mouth and inhaling it.

Hereinafter, an opening structure of the packaging pouch using the cutting line part 40 and the cutting notch 50 of the present invention will be described in detail with reference to FIGS. 4 to 7.

Figure 4:
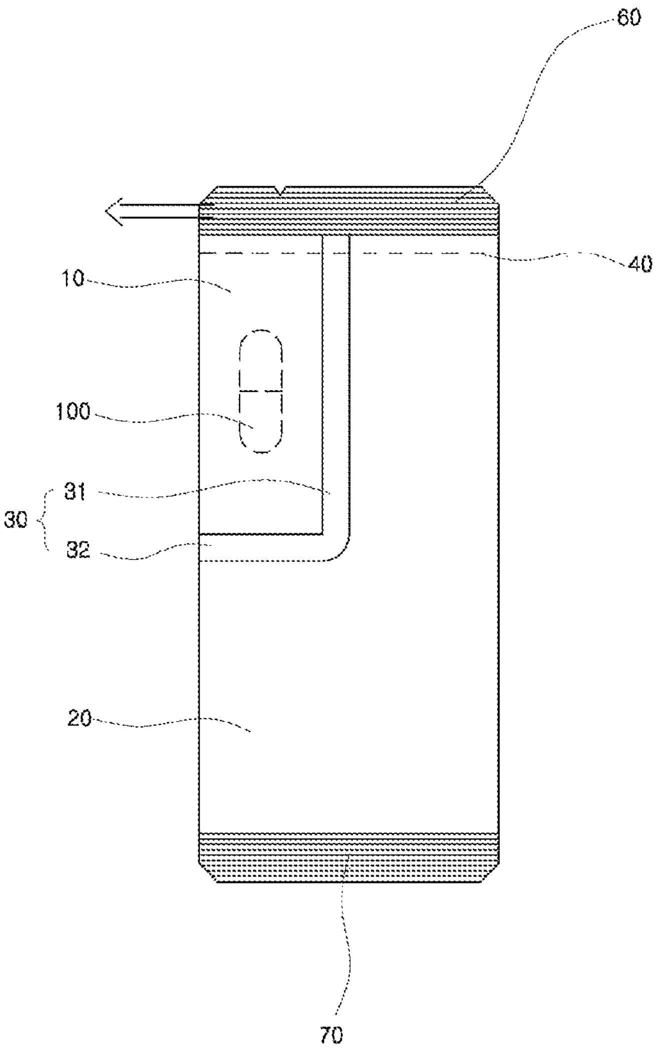
FIG. 4 is a conceptual diagram illustrating an opening direction of a pill storage compartment of the packaging pouch according to a preferred embodiment of the present invention.
Figure 5:
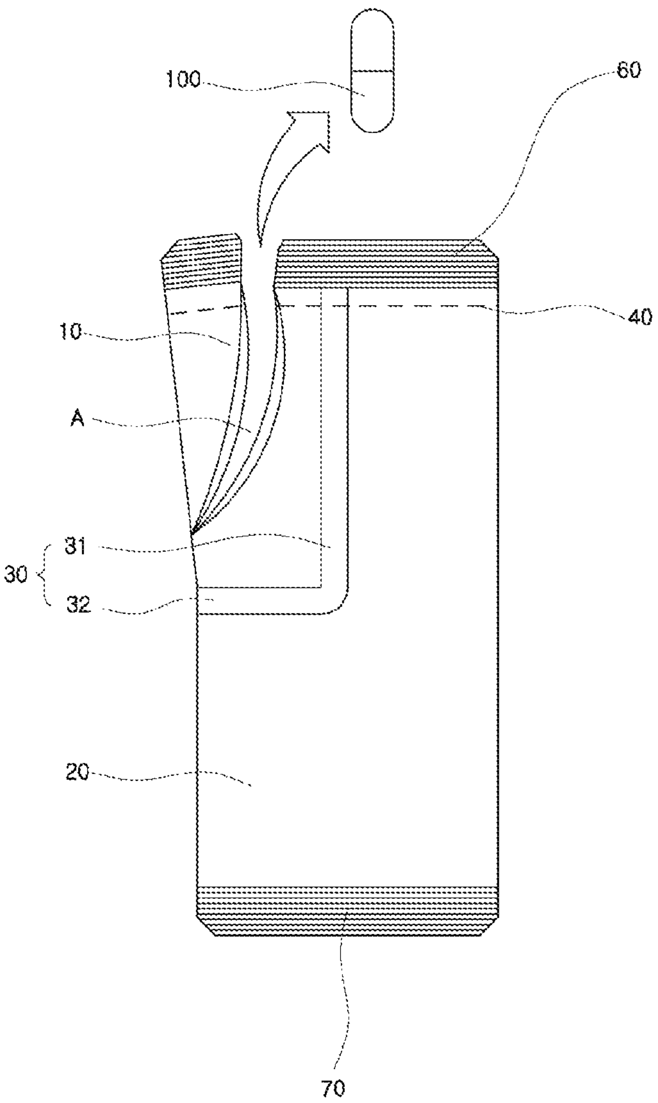
FIG. 5 is a conceptual diagram illustrating an opened state of the pill storage compartment of the packaging pouch according to a preferred embodiment of the present invention.
Figure 6:
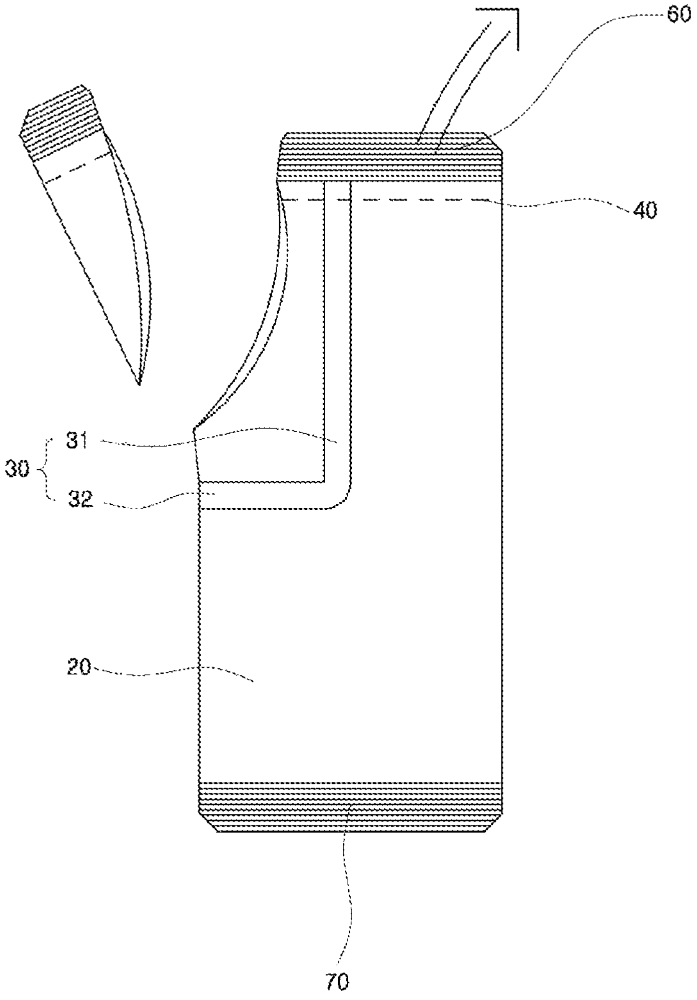
FIG. 6 is a conceptual diagram illustrating an opening direction of a potion storage compartment of the packaging pouch according to a preferred embodiment of the present invention.
Figure 7:
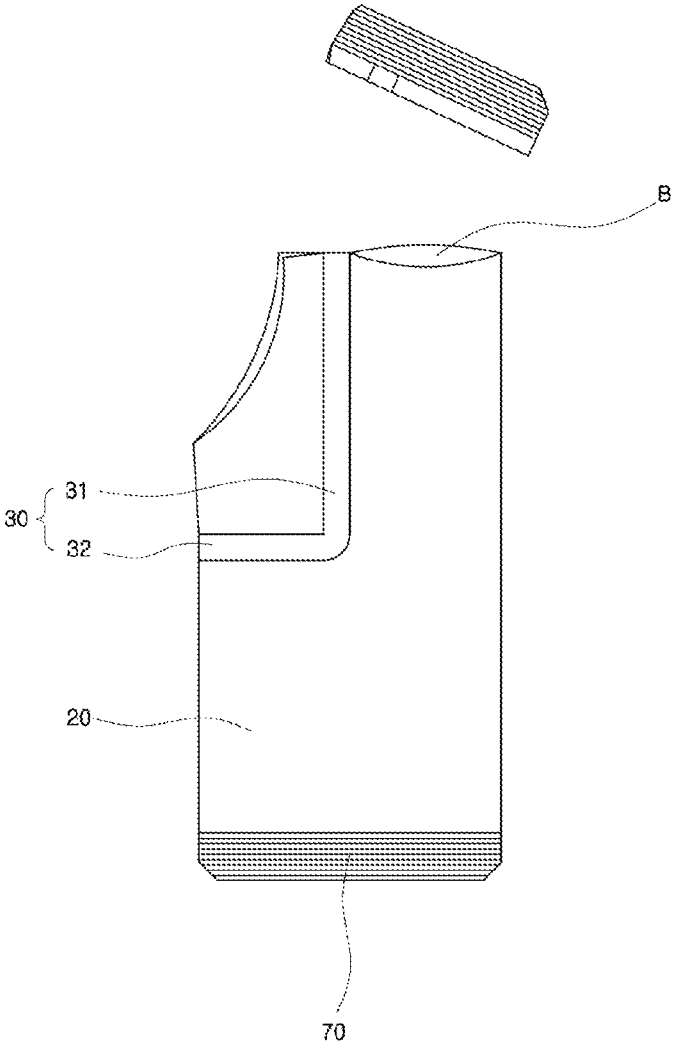
FIG. 7 is a conceptual diagram illustrating an opened state of the potion storage compartment of the packaging pouch according to a preferred embodiment of the present invention.

FIG. 4 is a conceptual diagram illustrating an opening direction of the pill storage compartment of the packaging pouch according to a preferred embodiment of the present invention, and FIG. 5 is a conceptual diagram illustrating a state where the pill storage compartment is opened. FIG. 6 is a conceptual diagram illustrating an opening direction of the potion storage compartment of the packaging pouch according to a preferred embodiment of the present invention, and FIG. 7 is a conceptual diagram illustrating a state where the potion storage compartment is opened.

In a preferred embodiment of the present invention, the pill storage compartment 10 and the potion storage compartment 20 of the pouch body 1 may be opened simultaneously. However, it is preferable to configure in a way that these compartments are individually opened to allow a user to take the medicines sequentially in this opened state. For example, in the pouch body 1 of the present invention, the user first opens the pill storage compartment 10 to take the pill contained therein and orally administers it, and then inhales the potion contained in the potion storage compartment 20. Thereby, it is possible to provide convenience for the user to easy swallow the pill together with the potion.

To this end, the packaging pouch of the present invention includes the cutting line part 40 formed in the upper portion of the pouch body 1 by penetrating at least one of the multi-layers of the packaging film along a predetermined imaginary line; and the cutting notch 50 formed by cutting away the upper end portion of the upper sealed part 60 downward in a predetermined section at an upper position of the pill storage compartment 10.

In a preferred embodiment of the present invention, the cutting notch 50 is formed in the upper sealed part 60 to easily open the pill storage compartment 10. The cutting notch 50 is formed by cutting away the upper end portion of the upper sealed part 60 in the predetermined section, and more preferably, may be formed by cutting away the upper end portion in a V shape to form a V-shaped groove. Accordingly, since the upper sealed part 60 will be cut along the cutting direction of the cutting notch 50 when an external force of a predetermined size is applied, the pill storage compartment 10 may be opened even with a small force.

Therefore, when the user grasps the upper sealed part 60 and pulls it in one direction (preferably in the lateral direction) based on the cutting notch 50, the upper sealed part 60 begins to tear with the cutting notch 50 as a starting point, and the film of the pouch body 1 is torn diagonally along the pill storage compartment 10 to open the pill storage compartment 10. Therefore, the user may easily obtain the pill through an opening A formed by tearing diagonally along the pill storage compartment 10. In this way, the size of the diagonally formed opening may be relatively larger than that of the upper opening of pouch body 1 formed by tearing the cutting line part 40, which will be described below, thus it provides an advantage that the user may easily take the pill accommodated in the pill storage compartment 10.

More preferably, the cutting notch 50 is arranged between an upper central portion of the pill storage compartment 10 and the first partition line 31. In this case, since the cutting notch 50 may be formed adjacent to the first partition line 31, it has an advantage of being able to increase the size of the opening when the pill storage compartment 10 is opened.

Meanwhile, the cutting line part 40 for opening the potion storage compartment 20 is formed horizontally in the upper portion of the pouch body 1, and preferably, is formed by penetrating the upper portion of the pouch body 1 along an imaginary line defined by one of a straight line and a dotted line extending from one end to the other end thereof.

The cutting line part 40 is formed by previously penetrating at least one layer among the multi-layers constituting the film of the pouch body 1. Accordingly, when the cutting line part 40 is torn by an external force, the upper portion of the pouch body 1 may be opened along the cutting line part 40 including the layer formed by penetrating in advance.

In a preferred embodiment of the present invention, the cutting line part 40 is formed at a position adjacent to the upper sealed part 60, thereby preventing the potion contained in the potion storage compartment 20 from leaking through an opening B formed by tearing process. In addition, the cutting line part 40 of the present invention is configured to open the potion storage compartment 20, but preferably, is formed to cross both the pill storage compartment 10 and the potion storage compartment 20 for ease of manufacturing according to simplification of the manufacturing process. Therefore, the upper portion of the pouch body 1 may be opened at once through the cutting line part 40, thereby allowing the user to take the pill in the pill storage compartment 10 and the potion in the potion storage compartment 20 at the same time, and the pill storage compartment 10 and the potion storage compartment 20 may also be opened individually.

Effects according to the preferred embodiment of the present invention configured as described above will be described below.

First, in a preferred embodiment of the present invention, the pouch body 1 is manufactured in the form of a narrow rectangular shape. Then, a small quantity of pills 100, which are manufactured and processed in a solid formulation, are inserted and packaged in the pill storage compartment 10 on the upper left side (based on the drawing) based on the sealed partition part 30, and a sufficient amount of potion to aid in the intake of pills, etc. is injected and packaged in the potion storage compartment 20 on the lower and right sides based on the sealed partition part 30. Accordingly, the pills and potion packaged in the pill storage compartment 10 and the potion storage compartment 20 may be stored separately so that they do not mix with each other.

When attempting to sequentially take the pills and potion separately packaged and stored in the pill storage compartment 10 and the potion storage compartment 20 of the pouch body 1, the user first opens the pill storage compartment 10 by grasping the upper sealed part 60 at the upper end thereof, then pulling it laterally downward. In this process, the pill storage compartment 10 is cut diagonally with the cutting notch 50 as a starting point and opened. Then, the user (patient) may obtain the pill contained therein through the opening A of the pill storage compartment 10 which is formed in this way.

Next, the user may open the potion storage compartment 20 along the cutting line part 40 by grasping the upper sealed part 60 formed at the upper portion of the potion storage compartment 20 and then pulling it in a predetermined direction. Preferably, the opening B of the potion storage compartment 20 is configured to bring the potion to the mouth of the user and inhale the potion contained therein. In this case, the narrow opening of the potion storage compartment 20 may facilitate inhalation.

Therefore, since the user may consume the pill obtained from the pill storage compartment 10 and the potion in the potion storage compartment 20 at the same time, thus to easily swallow the pill and take the medicine.

Although the preferred embodiments of the packaging pouch with easy-opening and easy-liquid drinking features of the present invention have been described above in detail, these are merely specific examples to aid understanding of the present invention, are not intended to limit the scope of the present invention. In addition to the embodiments disclosed herein, it is obvious to those skilled in the art that other modifications based on the technical idea of the present invention may be implemented.

DESCRIPTION OF REFERENCE NUMERALS

1: Pouch body
10: Pill storage compartment
20: Potion storage compartment
30: Sealed partition part
31: First partition line
32: Second partition line
40: Cutting line part
50: Cutting notch
60: Upper scaled part
70: Lower scaled part
80: Rear adhered part
100: Pills

What is claimed is:

1. A double formulation packaging pouch comprising:

a pouch body having a hollow storage space formed by sealing and adhering both ends of a rectangular packaging film consisting of multi-layers;

an upper sealed part formed by sealing and adhering an upper opening of the pouch body;

a lower sealed part formed by sealing and adhering a lower opening of the pouch body;

a sealed partition part formed by connecting a first partition line extending downward from an upper end of the pouch body and a second partition line extending laterally from one side of the pouch body with each other, then sealing and adhering front and rear sides of the packaging pouch along the first partition line and the second partition line, so as to separately form a pill storage compartment and a potion storage compartment on both sides thereof;

a cutting line part formed at an upper portion of the pouch body by penetrating at least one layer among the multi-layers of the packaging film along a predetermined virtual line; and a cutting notch formed by cutting away a predetermined section of the upper sealed part at an upper portion of the pill storage compartment, wherein the cutting notch is formed by cutting away an upper end portion of the upper sealed part downward in a predetermined section between an upper central portion of the pill storage compartment and the first partition line, and one or more of a thickness and a width of the second partition line are formed to be relatively larger than those of the first partition line.

2. The packaging pouch according to claim 1, wherein the first partition line extends vertically downward from an upper end the pouch body, and the second partition line extends horizontally from one side of the pouch body.

3. The packaging pouch according to claim 1, wherein the first partition line is spaced from a center of the packaging pouch to the other side by a predetermined distance.

4. The packaging pouch according to claim 1, wherein the cutting line part is formed by penetrating the upper portion of the packaging pouch along an imaginary line defined by one of a straight line and a dotted line extending from one end to the other end thereof.

5. The packaging pouch according to claim 1, wherein a connection portion of the first partition line and the second partition line is formed in a curved line.

* * * * *